(12) United States Patent
Huber et al.

(10) Patent No.: US 10,643,346 B2
(45) Date of Patent: May 5, 2020

(54) TARGET TRACKING METHOD PERFORMED BY A DRONE, RELATED COMPUTER PROGRAM, ELECTRONIC SYSTEM AND DRONE

(71) Applicant: THALES, Courbevoie (FR)

(72) Inventors: Clément Victor Huber, Toulouse (FR); Michel Roger, Toulouse (FR)

(73) Assignee: THALES, Courbevoie (FR)

( * ) Notice: Subject to any disclaimer, the term of this patent is extended or adjusted under 35 U.S.C. 154(b) by 147 days.

(21) Appl. No.: 15/952,312

(22) Filed: Apr. 13, 2018

(65) Prior Publication Data
US 2018/0300895 A1    Oct. 18, 2018

(30) Foreign Application Priority Data

Apr. 14, 2017   (FR) ...................... 17 00421

(51) Int. Cl.
| | | |
|---|---|---|
| *G06T 7/70* | (2017.01) | |
| *G06T 7/20* | (2017.01) | |
| *G05D 1/00* | (2006.01) | |
| *B64C 39/02* | (2006.01) | |

(52) U.S. Cl.
CPC .............. *G06T 7/70* (2017.01); *B64C 39/024* (2013.01); *G05D 1/0094* (2013.01); *G06T 7/20* (2013.01); *B64C 2201/021* (2013.01); *B64C 2201/123* (2013.01); *B64C 2201/146* (2013.01)

(58) Field of Classification Search
CPC ........ B64C 2201/021; B64C 2201/123; B64C 2201/146; B64C 39/024; G06T 7/70; G06T 7/20; G05D 1/0094
See application file for complete search history.

(56) References Cited

U.S. PATENT DOCUMENTS

| | | |
|---|---|---|
| 2006/0074557 A1 | 4/2006 | Mulligan et al. |
| 2010/0250022 A1 | 9/2010 | Hines et al. |
| 2016/0018822 A1 | 1/2016 | Nevdahs et al. |
| 2017/0038781 A1* | 2/2017 | Querejeta Masaveu ..................... B64C 39/024 |

FOREIGN PATENT DOCUMENTS

WO    WO-2014147042    9/2014

OTHER PUBLICATIONS

Rafi, et al, "Autonomous Target Following by Unmanned Aerial Vehicles", pp. 1-8.
Preliminary Search Report for FR1700421, dated Jan. 11, 2018.

* cited by examiner

*Primary Examiner* — Leon Flores
(74) *Attorney, Agent, or Firm* — B. Aaron Schulman, Esq.; Stites & Harbison, PLLC

(57) ABSTRACT

The invention relates to a method (34) for tracking a target (10), using an electronic target tracking system (14) on board a drone (12), the method (34) comprising at least determining (40) a movement trajectory of the drone (12), the trajectory comprising a plurality of successive orbits respectively centered on a plurality of successive positions (C) of the target (10), the orbit radius being able to vary, from one successive orbit to another, based on at least one element belonging to the group comprising:
- at least one datum (50) associated with the movement performance of the drone (12),
- the current position of the target (10),
- a predetermined elevation angle ($\zeta$) of the drone relative to the target (10),
- the current altitude of the drone (12) relative to the target (10).

8 Claims, 3 Drawing Sheets

TARGET TRACKING METHOD PERFORMED BY A DRONE, RELATED COMPUTER PROGRAM, ELECTRONIC SYSTEM AND DRONE

FIELD OF THE INVENTION

The present invention relates to a method for tracking a target, using an electronic target tracking system on board a drone, in particular an aerial drone.

The invention also relates to a computer program including software instructions which, when executed by a computer, implement such a target tracking method.

The invention also relates to an associated electronic system for tracking a target. The invention also relates to a drone configured to track a target and comprising the aforementioned electronic system.

BACKGROUND OF THE INVENTION

The invention offers many applications, in particular trajectory determination for tracking moving targets.

The invention in particular relates to the field of remotely-piloted flying motorized apparatuses, also called drones (or UAV, Unmanned Aerial Vehicles), in particular dedicated to land or maritime surveillance. The invention is then particularly useful to optimize guiding of the drone when the drone is in a tracking mode to track a given target moving on the ground or over water.

To track land or maritime moving targets, an existing solution consists of implementing remote piloting of the aerial drone by an operator on the ground to track a moving target. However, this solution is limited by the range of the link between the drone and the operator, this range limiting the movement autonomy of the drone relative to the operator on the ground controlling it.

To resolve this, autonomous solutions for automating target tracking have been developed, which include the so-called tangent method described in the article "*Autonomous Target Following by Unmanned Aerial Vehicles*" by Rafi et al., based on the autonomous (i.e., without any operator intervention) determination by the drone of a trajectory comprising a series of circles respectively centered on successive positions of the moving target. This technique is also based on slaving to the current "drone-target" distance, the current "drone-target" distance being measured in a plane (2D), horizontal relative to the surface of the ground, the plane comprising both the point representative of the current position of the target and the projection in this plane of the point representative of the current position of the drone.

However, none of the solutions proposed to date are fully satisfactory, in particular in terms of continuous visibility of the target and in terms of trajectory optimization, such that the entire trajectory is "flyable" by the drone.

SUMMARY OF THE INVENTION

To that end, the invention relates to a target tracking method, using an electronic target tracking system on board a drone of the aforementioned type, wherein the method comprises at least the determination of a movement trajectory of the drone, the trajectory comprising a plurality of successive orbits respectively centered on a plurality of successive positions of the target, the orbit radius being able to vary, from one orbit to another, based on at least one element belonging to the group comprising:

at least one datum associated with the movement performance of the drone,
the current position of the target,
an elevation angle (predetermined by the drone relative to the target),
the current altitude of the drone relative to the target.

The target tracking method according to the invention then makes it possible to provide, continuously and autonomously, visibility of the moving target and therefore improved tracking of the moving target.

In other words, the slaving according to the invention to the current position of the target, and/or to a predetermined elevation angle, and/or to at least one datum associated with the movement performance (speed (i.e., speed domain or range delimited by a predetermined minimum and maximum speed), maximum roll angle, etc.) of the drone, and/or to the altitude of the drone, makes it possible to guarantee visibility of the target by the drone throughout its entire tracking trajectory.

Subsequently, "orbit" refers to a curved trajectory in the air, followed by the moving drone (i.e., during flight and defined within a circle whose center is a position of the target and whose altitude is optionally suitable for ensuring a good viewing angle. In other words, an orbit is a three-dimensional curved trajectory; a circle, an altitude.

Furthermore, "current position" of the target refers to the three-dimensional position of the target, in other words the position of the target expressed in three spatial dimensions.

According to other advantageous aspects of the invention, the electronic coupling method comprises one or more of the following features, considered alone or according to all technically possible combinations:

the determination of the trajectory is updated each time the position of the target changes;
the method comprises, before determining the trajectory:
    receiving the current position of the target,
    comparing the current position with the previous position of the target, and
    detecting a change in position of the target as a function of the comparison;
the method further comprises at least one phase for developing a trajectory segment to be followed, the development phase comprising determining a current position of the drone relative to the current trajectory orbit desired for the drone, and determining the trajectory segment to be followed by the drone based on the current position of the drone to join the current orbit; in which method:
    when the current position of the drone is inside the current orbit, the trajectory segment to be followed follows the current orbit, or
    when the current position of the drone is outside the current orbit, the trajectory segment to be followed is a segment of the tangent to the current orbit, the tangent passing through the current position of the drone;
the method is reiterated periodically with a predetermined period;
the method further comprises determining a guiding setpoint of the drone based on at least one trajectory deviation between the current trajectory segment and the trajectory segment to be followed;
the determination of a movement trajectory of the drone comprises verifying the observation distance of the target by the drone and, based on the verification result, determining a change in the altitude or elevation angle of the drone.

Subsequently, "current" refers to the current trajectory segment, the position of the drone, or the current position of the target at a moment t; "previous position" refers to a position prior to the current position (i.e., at a moment $t_0<t$); and "trajectory segment to be followed" refers to a curved or straight trajectory portion to be followed during the period of time separating two successive trajectory segment optimization phases.

The invention also relates to a computer program including software instructions which, when executed by a computer, implement a target tracking method as defined above.

Hereinafter, the reference to a computer program which, when run, performs any one of the aforementioned software instructions, is not limited to application software run on a single host computer.

In other words, the terms computer program and software are subsequently used in a general manner to refer to any type of computer code (for example, application software, firmware, microcode, or any other form of computer instruction) that can be used to program one or several processors to carry out the target tracking method as defined above.

The invention also relates to a target tracking electronic system on board a drone comprising a module for determining a movement trajectory of the drone, the trajectory comprising a plurality of successive orbits respectively centered on a plurality of successive positions of the target, the orbit radius being able to vary, from one successive orbit to another, based on at least one element belonging to the group comprising:
at least one datum associated with the movement performance of the drone,
the current position of the target,
a predetermined elevation angle of the drone relative to the target,
the current altitude of the drone relative to the target.

According to other advantageous aspects of the invention, the electronic target tracking system comprises one or more of the following features, considered alone or according to all technically possible combinations:
the electronic target tracking system is able to be connected to a module for determining the current position of the target,
the determination module is a radar and/or an image sensor on board the drone.

The invention also relates to a drone configured to track a target, the drone comprising the aforementioned electronic target tracking system.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION OF THE INVENTION

By convention in the present application, the expressions "substantially equal to" and "approximately" will each express a relationship of equality to within plus or minus 10%.

Figure 1:
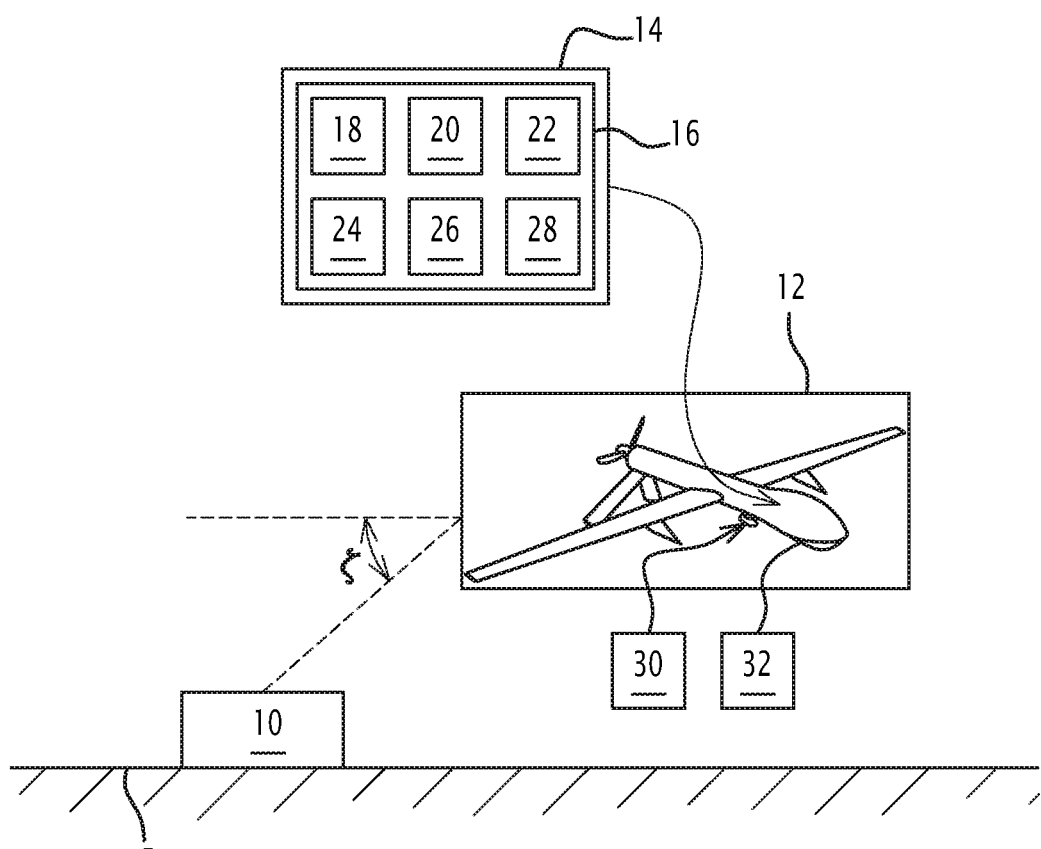
FIG. 1 is a schematic illustration of a drone comprising an electronic target tracking system according to the invention.

In the example of FIG. 1, a target 10 is tracked by a drone 12, i.e., a moving vehicle with no pilot on board. The target 10 is able to move over a surface S (i.e., the target is moving), such as a water surface or a land surface, and for example corresponds to an individual or a vehicle.

Subsequently, according to the example shown in FIG. 1, the drone 12 is an aerial drone monitoring the overflown terrain, and is for example a drone from a higher category than drones available to the general public in terms of certification constraints, such as a TUAV (Tactical Unmanned Aerial Vehicle), MALE (Medium Altitude, Long Endurance), HALE (High Altitude, Long Endurance), or UCAV (Unmanned Combat Aerial Vehicles) drone. Such higher-category aerial drones 12 in particular comprise an automatic flight management system, not shown.

As illustrated in FIG. 1, during mutual movements of the drone 12 and the target 10, a predefined elevation angle is the angle $\zeta$ formed between the horizontal plane of the drone 12 and the straight line going from the drone 12 to the target 10.

An electronic target tracking system 14 is on board the drone 12. Such an electronic target tracking system 14 is configured to determine the trajectory of the drone 12 such that it follows the target 10 more faithfully with continuous visibility thereof.

As an optional addition, the electronic target tracking system 14 is able to be integrated within the flight management system (FMS), not shown, when the drone 12 has one.

To that end, the electronic target tracking system 14 in particular comprises an information processing unit 16, for example formed by a memory 18 and a processor 20, for example of the GPU (Graphics Processing Unit) or VPU (Vision Processing Unit) type associated with the memory 20.

Optionally, when the drone 12 has a flight management system FMS, the information processing unit 16 is able to be connected at the input of the flight management system FMS or is directly integrated therein.

The information processing unit 16 further comprises a module 22 for updating the current position of the target 10 and the state of the drone 12 ("state" refers to the position, heading, instantaneous speed, etc. data) from predetermined data received in real time. These data are for example provided by a determination module on board the drone 12, or according to another example received after being sent by an operator on the ground. Such an update module 22 can in particular be connected to the memory 18 to record any new position of the target 10.

To that end, the update module 22 in particular comprises:
a receiver, not shown, configured to receive the current position of the target 10,
a comparator, for example software, not shown, configured to compare a current position of the target with a previous position of the target stored in the memory 18, and
a detection module, not shown, able to be connected to the comparator and configured to detect any position variation of the target corresponding to a difference between the current position of the target and the previous position of the target as a function of the result (in no way representative of a position invariance and in no way representative of a position difference) delivered by the comparator and configured to store the current position of the target 10 (i.e., new position of the target) when the latter is different from the target position 10 previously stored in the memory 18.

Furthermore, the information processing unit 16 also comprises a module 24 for determining the movement trajectory of the drone, the trajectory comprising, according to the invention, a plurality of successive orbits respectively centered on a plurality of successive positions of the target.

An orbit is for example preferably circular or in the form of a hippodrome, elliptical, a FIG. 8, etc.

The inlet of such a module 24 for determining the trajectory is able to be connected to the outlet of the update module 22. Furthermore, such a module 24 for determining the trajectory is in particular configured on the one hand to center the current orbit on the current position of the target 10, and on the other hand to calculate the instantaneous radius of the orbit as a function of the predetermined elevation angle $\zeta$ of the drone 12 relative to the target 10 and/or as a function of the performance (speed, maximum roll angle, etc.) of the drone and/or as a function of the altitude of the drone relative to the target.

According to one particular aspect, such a module 24 for determining the trajectory is able to be activated in an event-driven manner, in other words, upon each event corresponding to a detection of a difference in position of the target 10.

The information processing unit 16 also comprises a module 26 for developing (i.e., determining) a flyable trajectory segment to be followed for a predetermined period. The inlet of such a module 26 is able to be connected to the outlet of the update module 22 and/or the outlet of the module 24 for determining the trajectory.

Furthermore, such a module 26 for developing a flyable trajectory segment to be followed is configured, on the one hand, to determine a current position of the drone relative to the current desired trajectory orbit for the drone 12, and on the other hand to determine the trajectory segment to be followed by the drone 12 as a function of the current position of the drone 12 relative to the desired current orbit.

According to one particular aspect, such a module 26 for developing a flyable trajectory segment is iterative, in other words, able to be activated periodically according to a predetermined period dt stored beforehand by an operator. For example, the period dt used to reiterate the development module 26 is comprised between zero and five seconds, in particular equal to one second.

Furthermore, the information processing unit 16 also comprises a module 28 for determining a guiding setpoint as a function of a deviation between the current trajectory segment and the trajectory segment to be followed.

The inlet of such a module 28 for determining the guiding setpoint is able to be connected to the outlet of the module 26 for developing a flyable trajectory segment to be followed.

This module 28 for determining guiding setpoints is configured to provide guiding setpoints from data produced by the sensors of the drone, not shown (inertial unit, geo-location module, speed estimator, barometer, etc., which at all times evaluate the actual instantaneous attitude of the drone, its position, its altitude and its speed) so as to produce, if applicable, speed corrections provided to the propulsion module, not shown, of the drone 12, attitude corrections or altitude corrections to a guiding system of the drone 12 comprising at least one module for controlling the control surfaces.

In the example of FIG. 1, the module 24 for determining the trajectory, the module 26 for developing a flyable trajectory segment and the module 28 for determining a guiding setpoint are each made in a hardware form corresponding to a programmable logic component activated by the processor 20, such as an FPGA (Field Programmable Gate Array), or in the form of a dedicated integrated circuit, such as an ASIC (Applications Specific Integrated Circuit).

According to one alternative, not shown, the module 24 for determining the trajectory, the module 26 for developing a flyable trajectory segment and the module 28 for determining a guiding setpoint are each made in a software form executable by the processor 34. The memory 18 of the information processing unit 16 is then able to execute software for determining the trajectory, software for developing a flyable trajectory segment. The processor 20 of the information processing unit 16 is then able to execute the detection software as well as, optionally and additionally, the tracking software and the comparison software.

The different modules 22, 24, 26, 28 of the electronic target tracking system 14 according to the invention are, as shown in the example of FIG. 1, implemented using a same processor 20 or on a same electronic circuit, not shown, or according to one alternative, not shown, distributed on several processors or several circuits.

In particular, the drone 12 comprises a module for determining the current position of the target able to be connected to the update module 22.

Such a module for determining the current position of the target is for example separate from the electronic target tracking system 14 (i.e., located outside the housing comprising the electronic target tracking system 14).

For example, as shown in FIG. 1, the module for determining the current position of the target corresponds to an image sensor 30 or to a radar 32.

The image sensor 30 is for example a vertical-viewing camera pointing downward and configured to capture successive images of terrain flown over by the drone 12.

Alternatively or additionally, the image sensor 30 is a front-viewing camera, not shown, making it possible to obtain an image of the scene toward which the drone 12 is oriented. Such a sensor is connected to a module interpreting the image (i.e., an image processing module), not shown, making it possible to extract the position of the target, from the captured image.

Figure 2:
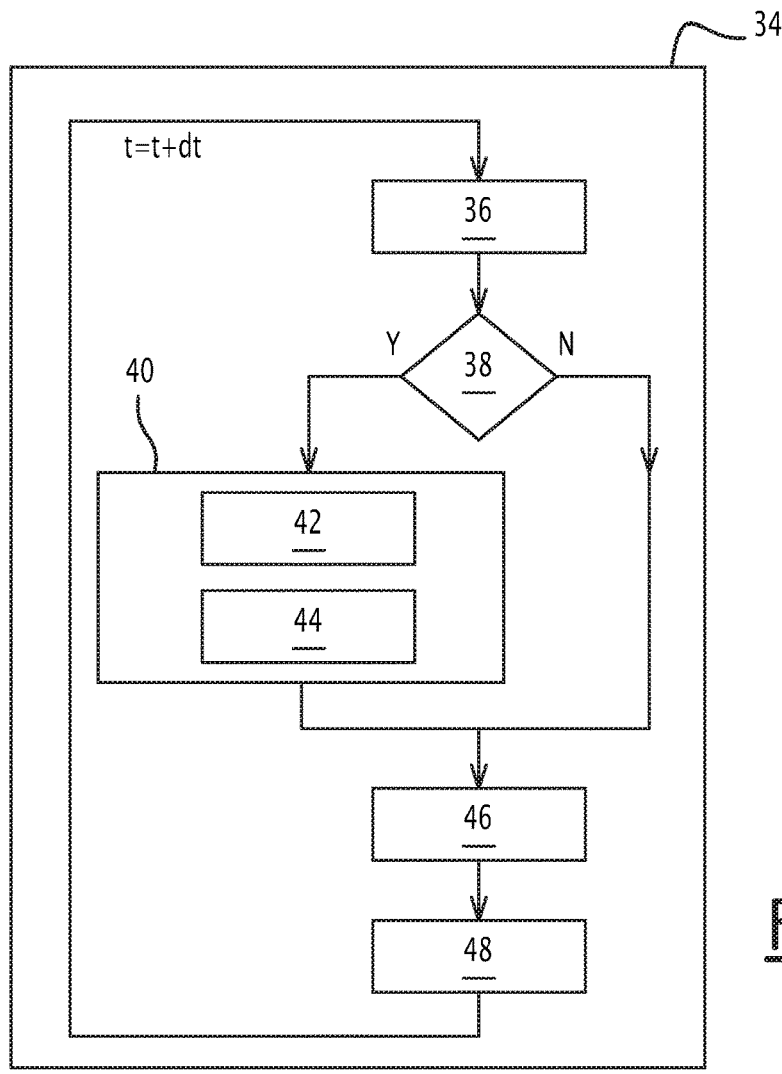
FIG. 2 is a flowchart of a target tracking method according to the invention.

The operation of the electronic target tracking system according to the invention will now be described using FIG. 2, showing a flowchart of the target tracking method 34 according to the invention, implemented by a computer.

During an initial step 36, the current position of the target and the current state of the mobile tracker (position, heading, etc.) are updated by the update module 22.

To that end, the initial step 36 comprises a step for receiving the current position of the target 10 provided, for example, by a module for determining the current position of the target 10 for example corresponding to the image sensor 30 or the radar 32 according to FIG. 1. Such a sensor being connected to a module interpreting the image (i.e., an image processing module), not shown, making it possible to extract the position of the target, from the captured image.

According to another example, the receiving step comprises receiving the current position of the target 10 previously sent by an operator on the ground remote from the drone.

During a following step 38, the comparison of the current position with the previous position of the target 10 is implemented, the previous position of the target for example being stored in the memory 18 of the processing unit 16.

The result of this comparison 38 makes it possible to detect a change in current position of the target as a function of the positive Y or negative N result of the comparison 38.

In particular, in the case where the position of the target 10 is not modified (i.e., update, for example because the target has stopped or for example entered a tunnel and the sensor 30, no longer seeing the target 10, no longer knows how to give it a new position), the orbit is not modified N and the drone 12 will slave itself to the last defined observation orbit.

If the position is detected as modified, a step 40 is activated, the determination of a movement trajectory of the drone 12 is carried out by the trajectory determining module 24, the trajectory comprising a plurality of successive orbits respectively centered on a plurality of successive positions of the target, the orbit radius being able to vary from one successive orbit to another.

To that end, step 40 comprises two successive steps 42 for centering the orbit on the current position of the target and calculating 44 the instantaneous radius of the orbit as a function of a predetermined elevation angle ζ, the performance (speed, maximum roll angle, etc.) of the drone and/or the altitude of the drone. In other words, according to this step 40, the observation orbit by the drone 12 of the target 10 is redefined both as a function of the current position of the target and of a predetermined elevation angle ζ, the performance of the drone, and/or the altitude of the drone.

For example, the predetermined elevation angle ζ is recorded beforehand in the memory 18, by an operator, via an entry interface, not shown, as a function of the mission of the drone 12 (i.e., as a function of the type of target to be tracked), or is able to be modified automatically during the mission (i.e., during the target tracking movement 10).

During a following step 46, a phase for developing a flyable trajectory segment to be followed is carried out by the module 26 for developing a trajectory segment.

As illustrated in FIG. 2, the implementation of step 40 for determining a movement trajectory of the drone 12 is carried out in an "event-driven" manner, since it is subject to the detection Y of a change in position of the target.

Differently, the implementation of the phase 46 for developing a flyable trajectory segment to be followed is cyclical and reiterated at a constant time interval dt. In other words, the development phase 46 is carried out periodically, independently of the implementation of step 40 for determining the trajectory (i.e., the positive Y or negative N result of the comparison step 38 is of little importance).

Then, during a following step 48, the determination of a guide setpoint of the drone 12 is carried out based on a deviation between the current trajectory segment and the trajectory segment to be followed. The state of the drone 12 resulting from the application of this setpoint is next reinjected at the input of the update step for the following development phase 46.

Thus, in real time, the drone 12 is able to correct its trajectory automatically (completely autonomously without human intervention) to continuously provide visibility of the moving target while maintaining a desired observation elevation angle, for example constant over at least part of the trajectory.

Figure 3:
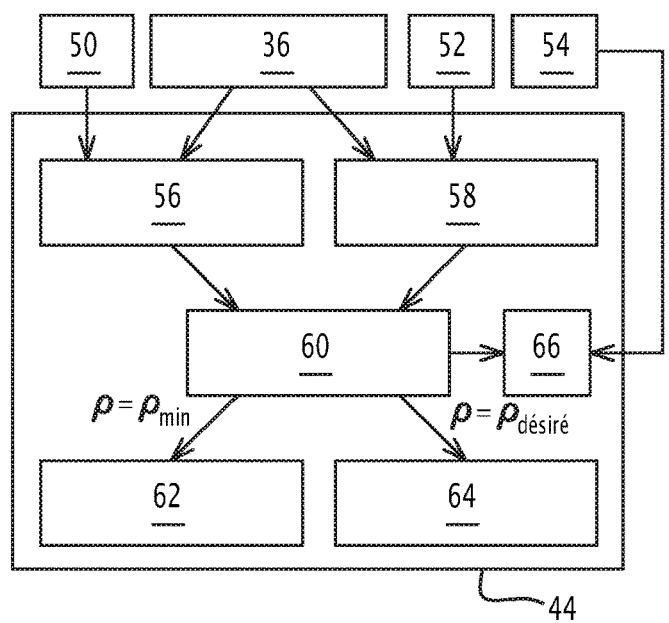
FIG. 3 is a flowchart of the orbit radius computation step of FIG. 2.

Step 44 for calculating the orbit radius of FIG. 2 is now outlined in connection with the example of FIG. 3.

According to this example of FIG. 3, the orbit whose radius requires calculation is circular.

According to the example of FIG. 3, the input data 50, 36, 52, 54 of this calculation step 44 corresponds to at least one element, or even all of the elements, belonging to the group comprising:

at least one datum 50 associated (i.e., associated indicator) with the movement performance of the drone 12, for example the horizontal speed $\vec{V}_{drone}$, the maximum roll angle $\phi_{max}$, the turning speed, etc.;

the update data 36 for the current position of the target 10 and the state of the drone 12, for example the altitude $Z_{cible}$ of the target 10 and the altitude $Z_{drone}$ of the drone 12, the desired elevation angle ζ 52, for example comprised between twenty and ninety degrees, the maximum observation distance 54 $\lambda_{max}$, characteristic associated with the performance of the sensor 30 and/or associated with the desired image resolution (i.e., the image quality).

More specifically, from data 50 associated with the movement performance of the drone 12 and update data 36, a step 56 for calculating the minimum radius of the orbit $\rho_{min}$ (i.e., the minimum turn radius, for example, for an aerial drone) is implemented using the following equation:

$$\rho_{min} = \frac{\|\vec{V}_{drone}\|^2}{g \tan \phi_{max}}$$

where g is the gravitational constant. In other words, the horizontal flight speed $\vec{V}_{drone}$ of the aerial drone 12 directly affects the minimum size of the orbits of the trajectory.

In parallel, as shown according to the example of FIG. 3, or according to alternatives, not shown, before or after step 56 for calculating the minimum radius, a step 58 for calculating the desired instantaneous radius of the orbit is carried out, from update data 36 and the desired elevation angle 52 ζ, according to the following equation:

$$\rho_{désiré} = \left| \frac{Z_{drone} - Z_{cible}}{\tan \zeta} \right|.$$

In other words, the flying altitude $Z_{drone}$ of the aerial drone 12 directly affects the size of the orbits of the trajectory.

From these two radii $\rho_{min}$ and $\rho_{désiré}$ derived from the calculating steps 56 and 58, a step 60 for determining the radius ρ of the orbit is carried out such that the radius ρ corresponds to the maximum of the two radii $\rho_{min}$ and $\rho_{désiré}$. In other words, the radius ρ of the orbit is such that ρ=max($\rho_{min}$, $\rho_{désiré}$).

Thus, for different drone models 12 moving with different horizontal speeds $\vec{V}_{drone}$ and/or flight altitudes, $Z_{drone}$ the trajectory comprising a plurality of successive orbits will be different from one drone model 12 to the next.

When the result of step 60 is ρ=$\rho_{min}$, then the altitude of the drone $Z_{drone}$ is recalculated according to a step 62 so as to satisfy the desired elevation according to the equation $Z_{drone}=\rho_{min} \tan \zeta Z_{cible}$.

Conversely, if the result of step 60 is ρ=$\rho_{désiré}$, then the altitude of the drone $Z_{drone}$ is kept unchanged according to step 64.

In other words, the method 34 according to the invention initially favors the desired elevation by varying the radius ρ of the orbit rather than varying the altitude $Z_{drone}$ of the drone 12. Indeed, during operations involving multiple aerial drones 12, it is for example preferable to have a fixed flight altitude when a flight level is allocated to each drone, which is then free to move laterally at the flight level allocated to it. It is, however, necessary for the radius of the orbit ρ to be greater than the characteristic minimum radius of the performance of the drone. Otherwise, the desired altitude is too high or the altitude deviation with respect to the target is too small. In this case, according to the invention, the radius of the orbit is therefore frozen p at the value of the minimum radius $ρ_{min}$ and one varies the altitude $Z_{drone}$ of the drone 12 to continue to favor the desired elevation.

Furthermore, step 44 for calculating the orbit radius [and] determining a guiding setpoint of the drone 12 comprises a step 66 for verifying the instantaneous observation distance λ of the target 10 by the drone 12 and, based on the verification result, determining a change in the altitude or elevation angle ζ of the drone 12.

More specifically, step 66 for verifying the instantaneous observation distance λ comprises, as illustrated in FIG. 3, first a step 68 for calculating the instantaneous observation distance λ according to the following equation:

$$\lambda = \frac{\rho}{\cos\zeta}$$

and comparing the maximum observation distance 54 $λ_{max}$ (i.e., that the distance to the target 10 is not greater than the maximum detection distance of the sensor 30, in other words, that the resolution is lower than the desired resolution).

When $λ>λ_{max}$, then according to a step 70, the method 34 according to the invention triggers a step 72 for correcting the altitude $Z_{drone}$ of the drone 12 or changing the desired elevation angle ζ so as to reestablish at least an equality between the instantaneous observation distance λ and the maximum observation distance 54 $λ_{max}$ such that $$\lambda = \lambda_{max} = \left| \frac{\frac{z_{drone} - z_{cible}}{\tan\zeta}}{\cos\zeta} \right|.$$

The choice to modify the altitude $Z_{drone}$ or to change the elevation angle ζ is for example the responsibility of the drone's operator or stored beforehand in the memory 18, for example based on the mission to be carried out by the drone 12. Indeed, based on the mission to be carried out by the drone 12, for stealth reasons, the change 72 of the altitude $Z_{drone}$ or the change 72 of the observation angle ζ will be favored.

Preferably, it is for example chosen to keep the observation angle ζ constant. According to this alternative, the change 72 of the altitude $Z_{drone}$ of the drone 12 done so as to reestablish at least an equality between the instantaneous observation distance λ and the maximum observation distance 54 $λ_{max}$ takes priority over step 62, where, when $ρ=ρ_{min}$, the altitude of the drone $Z_{drone}$ is recalculated so as to satisfy the desired elevation according to the equation $Z_{drone}=ρ_{min} \tan ζ+Z_{cible}$.

In other words, according to this alternative embodiment, above all, the equality between the instantaneous observation distance λ and the maximum observation distance 54 $λ_{max}$.

When $λ≤λ_{max}$, then according to a step 74, the method 34 according to the invention completes the verification 66 of the instantaneous observation distance λ and continues by the cyclical phase 46 for developing a trajectory segment to be followed.

Figure 5:
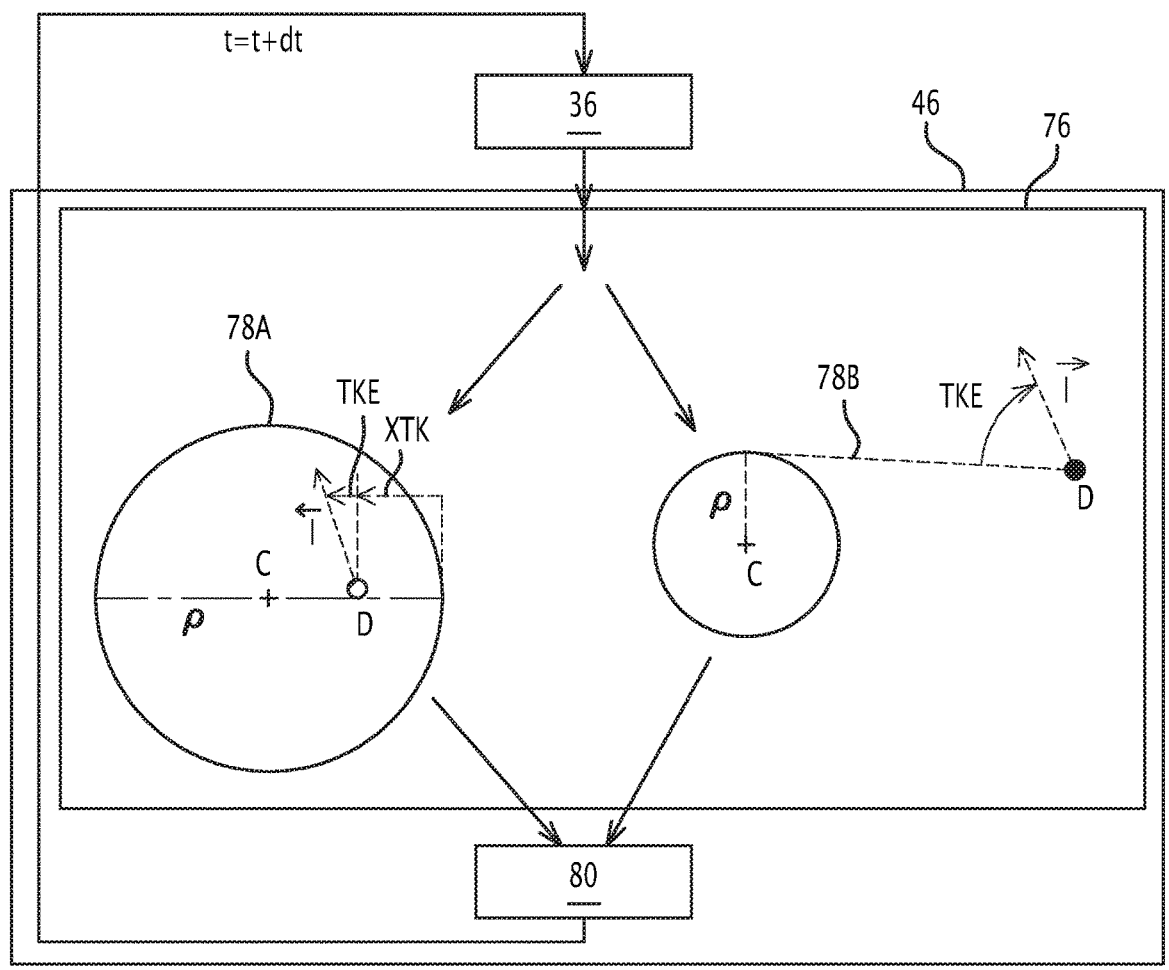
FIG. 5 is a flowchart of the phase for developing the trajectory to be followed of FIG. 2.

The cyclical phase 46 for developing a trajectory segment to be followed of FIG. 2 is now outlined in relation to the example of FIG. 5.

From the orbit centered on the current position C of the target 10 and with radius ρ and/or from update data 36 comprising the position of the drone 12, a step 76 for determining a current position D of the drone 12 relative to the current trajectory orbit followed by the drone 12 and determining the trajectory segment to be followed by the drone is carried out.

More specifically, when the current position de of the drone 12 is inside the current orbit 78A (i.e., the elevation is higher than desired), the trajectory segment to be followed tracks the current orbit 78A.

Thus, compared to the tangent method described in the article "*Autonomous Target Following by Unmanned Aerial Vehicles*" by Rafi et al., where, when the current position D of the drone 12 is inside the current orbit 78A (i.e., the elevation is lower than desired), the drone flies in a straight line until it leaves the orbit, a better strategy for rejoining the orbit as soon as possible is proposed according to the present invention.

Conversely, when the current position D of the drone 12 is outside the current orbit 78A (i.e., the elevation is lower than desired), the trajectory segment to be followed is a segment 78B of the tangent to the current orbit, the tangent passing through the current position D of the drone 12. In other words, in this case, it is proposed according to the invention for the drone 12 to rejoin the orbit along the tangent to the circle passing through its position D. The choice of the tangent is for example based on the speed vector of the target and/or its direction. In this example, it is "the closest tangent" that has been chosen, here meaning the tangent requiring the smallest heading correction from the current heading of the drone 12.

Figure 4:
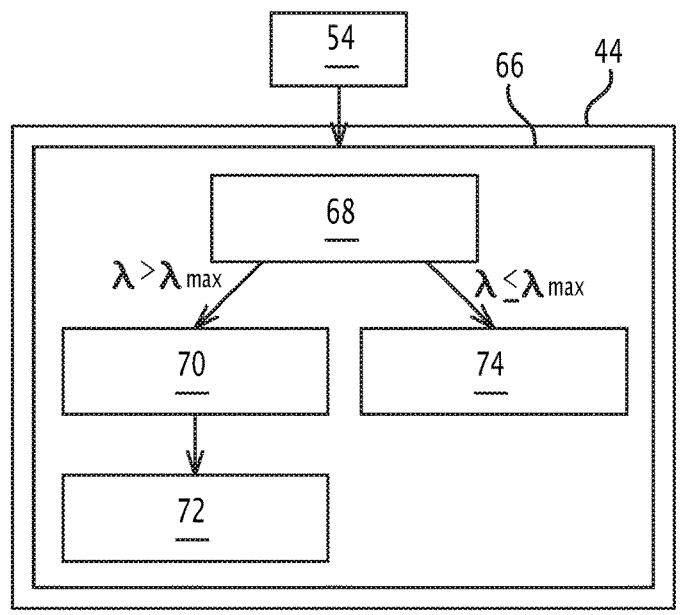
FIG. 4 is a flowchart of the step for verifying the observation distance of the target by the drone.

The trajectory segment to be followed 78B is then defined as the tangent segment comprised between the current position D of the drone 12 and the tangent point as shown in FIG. 4.

Additionally, a step 80 for determining guiding parameters is carried out.

More specifically, these guiding parameters correspond to the lateral separation XTK as well as the heading error TKE between the current trajectory segment and the trajectory segment to be followed.

In particular, when the trajectory segment be followed is a segment 78B of the tangent to the current orbit, the lateral deviation XTK is zero by definition and the heading error TKE corresponds to the angle between the current heading of the moving target and the heading of the current segment.

The development phase 46 is reiterated periodically according to a period dt for example comprised between zero and five seconds, in particular equal to one second.

Once in possession of the deviations XTK and TKE delivered at the end of the cyclical development phase 46, step 48 for developing a guiding setpoint of the drone 12 is carried out by the module 28 for determining a guiding setpoint, which, when the drone 12 has a flight management system FMS, is able to be connected at the input of the flight management system FMS or is directly integrated therein.

Thus, when the drone 12 has a flight management system FMS, the flight management system FMS in particular uses an acquisition and holding law for horizontal trajectories, implanted in it and commonly called "Hpath" (Horizontal Path) law, to create, from evaluated deviations, altitude and speed setpoints sent to the automatic pilot or the flight director.

Whether the current position D of the drone 12 is inside or outside the current orbit 78A, the guiding setpoint is determined identically. For example, the guiding setpoint is a roll setpoint in the case of a fixed-wing aerial drone 12 according to the Hpath law already implemented in the flight management system FMS. This roll command is next sent to the guiding system of the drone 12.

The set of steps of the method 34 previously described is reiterated periodically according to a period dt for example comprised between zero and five seconds, in particular equal to one second.

One can thus see that the target tracking method 34, or the associated electronic system 14 or drone 12, make it possible to offer an intuitive target 10 tracking strategy, the trajectory provided by the method 34 being substantially the same trajectory as that which would be followed by a pilot, and thereby optimal at each moment within the meaning of optimal control theory ("bang-singular-bang" solution to the minimum time problem), but also due to the inactivation principle.

Furthermore, the method 34 proposed according to the invention is robust, easily connected or integrated within a flight management system FMS, and able to adapt to the constraints of missions to provide target tracking even in downgraded cases (for example, if the target disappears for a length of time).

The invention claimed is:

1. A method for tracking a target, using an electronic target tracking system on board a drone,
   the method comprising at least determining a movement trajectory of the drone, the trajectory comprising a plurality of successive orbits respectively centered on a plurality of successive positions of the target, the orbit radius being able to vary, from one orbit to another, based on at least one element selected from the group consisting of:
   at least one datum associated with the movement performance of the drone,
   the current position of the target,
   a predetermined elevation angle of the drone relative to the target, and
   the current altitude of the drone relative to the target;
   wherein the determining method further comprises at least a development phase for developing a trajectory segment to be followed, the development phase comprising determining a current position of the drone relative to the current orbit of desired trajectory for the drone, and determining the trajectory segment to be followed by the drone based on the current position of the drone to join the current orbit; and
   wherein:
   when the current position of the drone is inside the current orbit, the trajectory segment to be followed follows the current orbit, or
   when the current position of the drone is outside the current orbit, the trajectory segment to be followed is a segment of the tangent to the current orbit, the tangent passing through the current position of the drone.

2. The target tracking method according to claim 1, wherein the determination of the trajectory is updated each time the position of the target changes.

3. The target tracking method according to claim 1, wherein the method is reiterated periodically according to a predetermined period.

4. The target tracking method according to claim 1, wherein the method further comprises determining a guiding setpoint of the drone based on at least one trajectory deviation between the current trajectory segment and the trajectory segment to be followed.

5. The target tracking method according to claim 4, wherein the determination of a movement trajectory of the drone comprises verifying the observation distance of the target by the drone and, based on the verification result, determining a change in the altitude or elevation angle of the drone.

6. A non-transitory computer-readable storage medium comprising software instructions which, when executed by a computer, carry out a method according to claim 1.

7. An electronic system on board a drone comprising a target tracker for determining a movement trajectory of the drone, the trajectory comprising a plurality of successive orbits respectively centered on a plurality of successive positions of the target, the orbit radius being able to vary, from one successive orbit to another, based on at least one element selected from the group consisting of:
   at least one datum associated with the movement performance of the drone,
   the current position of the target,
   a predetermined elevation angle of the drone relative to the target, and
   the current altitude of the drone relative to the target,
   wherein the target tracker further carries out at least a development phase for developing a trajectory segment to be followed, the development phase comprising determining a current position of the drone relative to the current orbit of desired trajectory for the drone, and determining the trajectory segment to be followed by the drone based on the current position of the drone to join the current orbit; and
   wherein:
   when the current position of the drone is inside the current orbit, the trajectory segment to be followed follows the current orbit, or
   when the current position of the drone is outside the current orbit, the trajectory segment to be followed is a segment of the tangent to the current orbit, the tangent passing through the current position of the drone.

8. A drone configured to track a target, the drone comprising an electronic system according to claim 7.

* * * * *